United States Patent [19]

Banke

[11] Patent Number: 4,981,401
[45] Date of Patent: Jan. 1, 1991

[54] BORING BAR WITH TOOL HOLDER STATIONS AND CONTROL FOR SAME

[76] Inventor: Donald W. Banke, 21562 NW. Dairy Creek Rd., Cornelius, Oreg. 97113

[21] Appl. No.: 350,205

[22] Filed: May 11, 1989

[51] Int. Cl.⁵ .......................................... B23D 77/00
[52] U.S. Cl. ................................. 408/152; 409/191; 51/346; 82/1.4; 74/422
[58] Field of Search .............. 408/152, 184, 705, 147, 408/7 B, 203, 222; 51/31, 34 R, 34 E, 346, 165.82; 82/1.2, 1.4; 75/272, 273, 122, 162; 74/29, 422; 407/71, 75, 78, 76, 77, 155, 45; 409/190, 191

[56] References Cited

U.S. PATENT DOCUMENTS

| 1,468,827 | 9/1923 | Morris | 408/152 |
| 1,643,264 | 9/1927 | Wetmore | 408/152 |
| 1,881,523 | 10/1932 | Guldager | 408/152 |
| 2,338,271 | 1/1944 | Vlanet | 74/89.17 |
| 2,484,480 | 10/1949 | Anderson | 77/56 |
| 3,073,186 | 1/1963 | Flannery | 77/58 |
| 3,113,475 | 12/1963 | Lombardo | 408/152 X |
| 3,237,487 | 3/1966 | Widmer et al. | 77/3 |
| 3,311,003 | 3/1967 | Daugherty | 408/152 X |
| 3,599,517 | 8/1971 | Muller | 408/152 X |
| 3,730,636 | 5/1973 | Mizoguchi | 408/169 |
| 4,044,618 | 8/1977 | Brown | 74/29 |
| 4,275,624 | 6/1981 | Murray | 82/1.2 |
| 4,369,007 | 1/1983 | Canady | 409/190 |
| 4,387,612 | 6/1983 | Eckle et al. | 82/1.2 X |
| 4,577,535 | 3/1986 | Klabunde et al. | 408/152 X |
| 4,761,103 | 8/1988 | Krstovic | 408/181 |

FOREIGN PATENT DOCUMENTS

| 198194 | 8/1906 | Fed. Rep. of Germany | 408/152 |
| 333275 | 11/1958 | Switzerland | 408/152 |
| 319391 | 1/1972 | U.S.S.R. | 408/147 |

OTHER PUBLICATIONS

Drilling Technology, Kror & Oswald, p. 136, 1977.

Primary Examiner—Z. R. Bilinsky
Assistant Examiner—Robert Schultz
Attorney, Agent, or Firm—James G. Givnan, Jr.

[57] ABSTRACT

A boring bar having multiple tool stations spaced therealong. A tool holder is carried at a tool station within a bar mounted bushing. A pinion gear on the bushing is in threaded engagement with the tool holder for moving same. A channel along the bar receives a gear rack in mesh with the pinion gear. Bar surfaces along with a closure at each station overlie rack surfaces to prevent chip entry. Tool holder feed including a threaded rod coupled to the rack and extending outwardly from the bar outer end to receive a handwheel. A limit stop is lockable along the bar to limit rack movement.

16 Claims, 1 Drawing Sheet

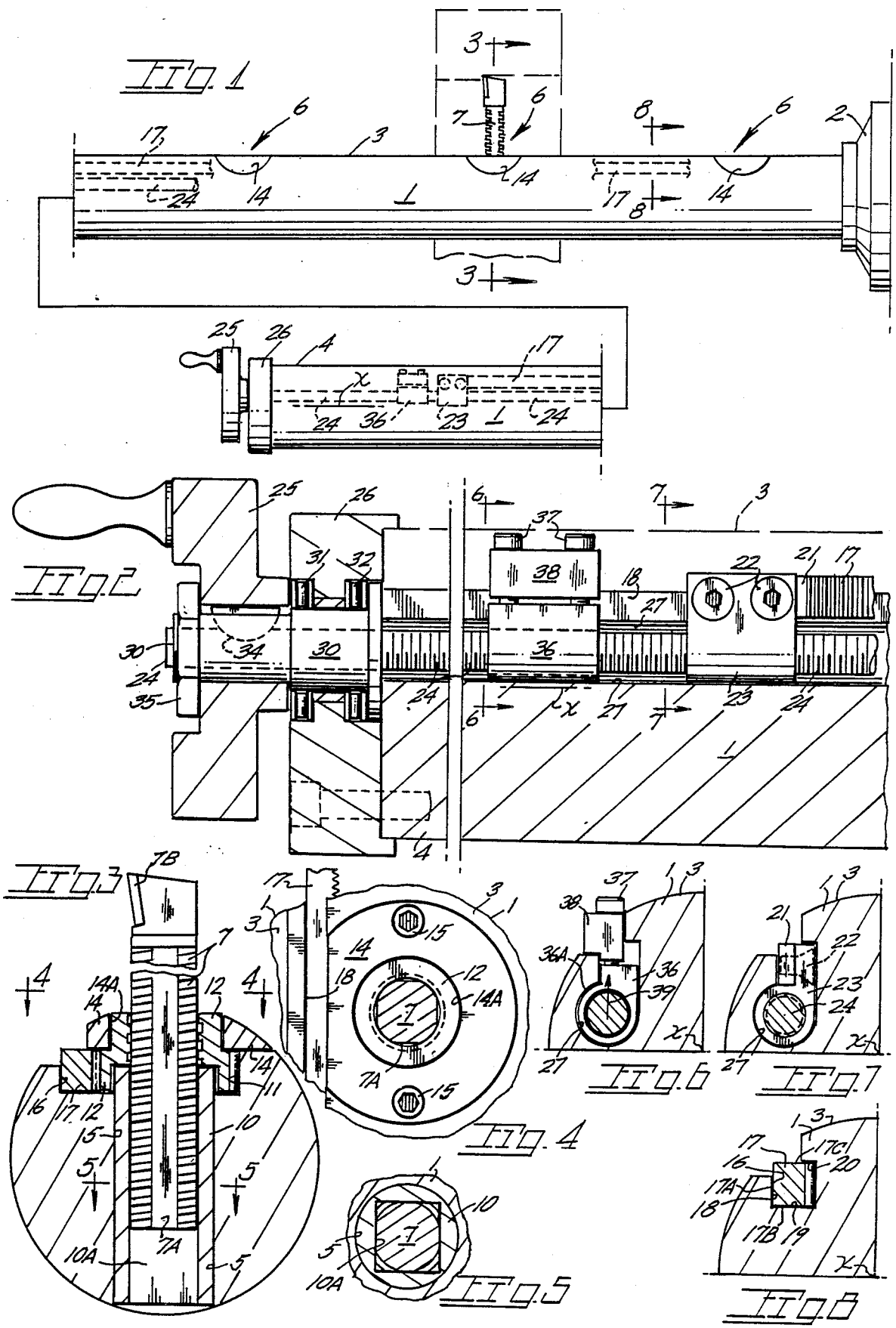

BORING BAR WITH TOOL HOLDER STATIONS AND CONTROL FOR SAME

BACKGROUND OF THE INVENTION

The present invention pertains generally to boring bars and the like for machining surfaces concentric with the axis of bar rotation.

In existing boring bars it is the practice to position the cutting tool in incremental fashion as machining progresses with each tool adjustment requiring access to the tool station at a point along the bar. Considerable time is expended in gaining access to and positioning of a tool holder depending on the work piece and the type of mill carrying the boring bar.

Attempts at providing remotely positioned controls for positioning a tool holder radially of a boring bar are disclosed in U.S. Pat. No. 4,275,624 wherein a splined shaft extends lengthwise of a boring bar and engages a splined tool holder to impart movement to the holder radially of the bar. A control is located at the bar end and includes an internally threaded handwheel acting on a threaded rod which in turn axially positions the splined shaft. The splined shaft, as well as the tool holder, require the task machining of inter-engaging teeth or splines with the splines carrying thrust as well as rotational loads. Further, the pitch of the splines is such as to render tool removal for manual pre-positioning of the tool difficult. Further, a boring bar must be drilled lengthwise off center a substantial distance with such drilling requiring a great deal of precision to prevent backlash between bar and tool holder. A key and keyway prevent tool rotation.

U.S. Pat. No. 3,237,487 discloses a powered bar having a head thereon with rack and pinion components operable to radially position cutting tools.

U.S. Pat. No. 4,369,007 discloses a threaded tool holder with an internally threaded pinion imparting radial movement to same. A ratchet drive powers the pinion. The tool holder has flats thereon to prevent rotation.

U.S. Pat. No. 3,730,636 discloses a boring head for installation in a boring machine with the head having a bit positioned by a rack and pinion.

U.S. Pat. No. 3,073,186 discloses a boring bar tool with a threaded tool holder having flat surfaces formed thereon to retain the shank against rotation in the boring bar.

U.S. Pat. Nos. 2,484,480 and 4,761,103 disclose cutting tools positioned radially of the boring bar by reason of the tool being carried in a threaded holder in engagement with a worm wheel.

SUMMARY OF THE PRESENT INVENTION

The present invention is embodied within a boring bar having tool stations spaced therealong with a lengthwise orientated rack driving gear means to radially position a tool holder positioned in a selected tool station.

The present boring bar retains a cylindrical exterior to permit the bar to be journalled for support at any point therealong. A tool holder in the selected tool station is extended and retracted by means of a pinion gear with square cut internal threads engaging like threads on the tool holder. A bushing is of rectangular cross section and prevents tool displacement during a machine operation. For imparting rotation to the pinion gear, a rack is slidably mounted in a channel extending along the bar with rack movement imparted by a control wheel. A closure plate includes an arcuate outer surface formed on the radius of the boring bar exterior permitting the boring bar to have an uninterrupted exterior surface. Closure plate removal permits removal of a tool holder and pinion gear which then may be quickly and manually adjusted and dropped back into place in the boring bar.

Important objectives of the present boring bar invention include the provision of a boring bar with tool receiving stations located therealong with each station including a pinion gear and bushing arrangement to impart radial movement to a tool holder while preventing tool holder rotation about the holder axis; the provision of a boring bar with spaced apart tool receiving stations with a rack slidably housed within a bar defined channel or guide-way with the rack driving a pinion gear which positions a tool holder; the provision of a boring bar having multiple tool stations therealong each having a detachable closure plate readily removed permitting pinion gear and tool holder removal for rapid manual adjustment of the tool holder and convenient drop-in re-insertion and reengagement with a bar carried rack; the provision of a boring bar with tool receiving means therealong each including a bushing having an opening therethrough of rectangular section with the bushing upper end serving to journal a pinion gear in a readily detachable manner; the provision of a boring bar having a channel or guideway in open communication with the bar exterior with a gear rack carried in said channel with the gear rack closing the guideway to entry of foreign particles; the provision of a boring bar having tool stations spaced therealong with an uninterrupted cylindrical bar exterior permitting the bar to be journalled in supports at any point therealong as well as move axially through such supports; the provision of a boring bar with multiple tool stations with tool feed means located adjacent the distal end of the boring bar permitting remote tool holder adjustment during bar rotation.

BRIEF DESCRIPTION OF THE DRAWINGS

FIG. 1 is a side elevational view of the present boring bar segmented for purposes of illustration;

FIG. 2 is an enlarged sectional view of the distal end of the boring bar shown in FIG. 1;

FIG. 3 is a vertical sectional view taken along line 3—3 of FIG. 1;

FIG. 4 is a horizontal sectional view taken downwardly along line 4—4 of FIG. 3;

FIG. 5 is a horizontal sectional view taken downwardly along line 5—5 of FIG. 3;

FIG. 6 is a vertical sectional view taken along line 6—6 of FIG. 2;

FIG. 7 is a vertical sectional view taken along line 7—7 of FIG. 2; and

FIG. 8 is a vertical sectional view taken along line 8—8 of FIG. 1.

DETAILED DESCRIPTION OF THE PREFERRED EMBODIMENTS

With continuing attention to the drawings wherein applied reference numerals indicate parts similarly hereinafter identified, the reference numeral 1 indicates a boring bar supported at one end in a powered spindle 2 of a boring mill or comparable machine.

The boring bar has a cylindrical outer surface 3 terminating at a distal end 4. At spaced intervals along said bar are tool holder stations 6 in which tool holder receiving means are located. The following description of a tool receiving station is applicable to all of the stations in which a tool holder 7 and bit may be carried in a radially positionable manner as described below.

At each station, tool receiving means includes a bushing 10 secured in a bar cross-bore 5 as by a pressed fit. The bushing has internal walls which define a polygonal opening 10A extending therethrough. The boring bar cross-bore 5 is counter bored at 11 (FIG. 3) to receive a pinion gear 12 journalled on the upper, free end of bushing 10. A bearing sleeve about the upper end of bushing 10 seats in a pinion counter bore to minimize wear. A thrust washer may be interposed between a bar surface and the end of pinion 12. A closure plate 14 is apartured at 14A to receive the pinion. The outer surface of plate 14 is on a radius and is concentric with the surface 3 of the boring bar. Inset cap screws at 15 secure the closure plate to the bar with the screw heads being below the plate surface. Closure 14 as well as pinion 12 may be manually lifted from the bar upon screw removal to permit the tool holder to be manually adjusted in the pinion with the tool holder and pinion subsequently dropped into engagement with bushing 10.

Actuator means for the tool receiving means at the stations includes channel 16 formed lengthwise along the bar past the stations. The channel receives a gear rack 17 with rack teeth in mesh with the pinion 12 at each station. Rack 17 has perpendicular, horizontal and vertical planar surfaces at 17A, 17B and 17C which are in sliding surfacial engagement with the underside of closure 14 and with bar surfaces 18, 19 and 20 defining channel 16. Such rack confinement prevents entry of particles into the channel. With attention to FIGS. 2 and 7, it will be seen that rack 17 terminates in a flat end segment 21 secured by machine screws 22 to a traveller nut 23. The actuator means further includes a threaded rod 24, in a rod receiving bore 27, constituting an actuator screw for gear rack 17. The rod 24 extends past distal end 4 (FIG. 2) of the boring bar for engagement with feed means as shown as a handwheel control 25. An end cap 26 is suitably attached to the boring bar end as by threaded fasteners with the cap counter bored in an offset manner from the bar major axis at X to receive thrust bearings 31 and 32. Handwheel 25 has a keyway for a woodruff key 34 seated in rod 24. A nut 35 retains the outer end of sleeve 30. While handwheel 25 is shown as tool feed means, it will be understood that other feed means besides manually operated may be utilized within the scope of the present invention.

A gear rack limit stop at 36 is best shown in FIGS. 2 and 6 and is settable along bore 27 to limit outward travel of traveller nut 23 to, in turn, limit extension of tool holder 7. Limit stop 36 includes a bar engaging surface 36A which may abut a portion of bore 27. Clearance is provided about rod 24 permitting stop adjustment and displacement per arrow 39 into bar abutment. A pair of bolts 37 extend downwardly through a block 38 of the limit stop.

In operation, rectilinear movement of rack 17 by handwheel 25 drives pinion 12 journalled on bushing 10. Pinion 12 and the tool holder therein are preferably provided with modified square threads to carry cutting loads imparted to the tool holder. The tool holder has machined flat areas as at 7A to provide planar surfaces each in sliding abutment with an internal, planar wall of bushing 10. The tool holder 7 will include a bit 7B determined by the machining task at hand e.g., boring, facing, grooving, etc.,. Typically closure plate 14 will be removed to allow manual removal of tool holder 7 and pinion 12 to permit the machinist to rapidly position the pinion along the tool holder to the approximate position desired. The threaded pinion and tool holder 7 are then dropped into engagement with bushing 10 with the pinion meshing with rack 17. Closure 14 is then reattached to cap screws 15. From a practical standpoint, it is envisioned that most often only one tool receiving station will be provided with a tool holder during a machining operation however, in certain instances, multiple tool holders could be utilized if so desired.

As the bar rotates, holding of the handwheel will cause the actuator screw to move gear rack; as gear rack moves, pinion gear will rotate. As pinion gear rotates, tool will move out and perform cutting operation. (Tool is restricted from rotation because of square shank design in square hole bushing.) By rotating handwheel in opposite direction (same direction as bar is rotating, for this example), the tool will retract from cut. Direction of tool travel (in-out), rate of feed and amount of tool travel is controlled by designs such as pitch diameter of pinion gear, left hand or right hand thread and pitch/lead of thread on both the actuator and the tool shank/pinion assembly. Tool travel is also controlled by the amount of rack travel designed into bar.

The following operations exemplify the versatility of this bar:
  A. Conventional straight boring of precision tool adjustment. Tool holder may be secured with a setscrew;
  B. Taper boring by incorporating an appropriate machine spindle feed in conjunction with a compatible tool feed;
  C. Grooving;
  D. Facing; and
  E. Single point threading.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:
1. A boring bar assembly comprising,
  a bar having cross-bores axially spaced along the bar for the reception of a threaded tool holder, said bar defining a channel in communication with said cross-bores,
  tool holder receiving means at each of said cross-bores and including a bushing in which a threaded tool holder may move for radial extension of same from the bar, a pinion gear within one of said cross-bores and open at its center and thereat having internal threads for engagement with a threaded tool holder for imparting radial movement to same, closure means removably mounted on said bar confining said pinion gear in place against displacement, and
  actuator means for rotating said pinion gear including a gear rack in said channel in mesh with said pinion gear, said gear rack extending across said cross-bores, tool feed means including a control adjacent one end of said bar for imparting linear movement to the rack whereby said linear movement of the rack rotates the pinion gear to position the tool holder radially of the bar.

2. The boring bar assembly claimed in claim 1 wherein said pinion gear is journalled on said bushing.

3. The boring bar assembly claimed in claim 1 wherein said pinion gear is counter bored for the reception of said bushing.

4. The boring bar assembly claimed in claim 3 wherein said bushing is fixedly secured within said cross-bore and protrudes into a cross-bore counter bore.

5. The boring bar assembly claimed in claim 1 wherein said channel is defined by wall surfaces same of which are contiguous with the outer surface of the bar.

6. The boring bar assembly claimed in claim 5 wherein said gear rack and said wall surfaces partially abut one another to prevent the entry of foreign particles into the channel.

7. The boring bar claimed in claim 6 wherein said closure means partially overlies both said pinion gear and a segment of the gear rack in mesh with the pinion gear with detachment of the closure means permitting pinion gear disengagement from the gear rack whereby the pinion gear may be manually and expeditiously adjusted along the tool holder for radical changes in tool holder extension.

8. The boring bar claimed in claim 1 wherein said bar has a substantially uninterrupted cylindrical outer surface with said closure means having an arcuate surface contiguous with the bar outer surface.

9. The boring bar claimed in claim 1 wherein said channel is defined by internal wall surfaces with one of said surfaces overlying the gear rack teeth to shield same from metal particles.

10. The boring bar assembly claimed in claim 1 wherein said actuator means additionally includes a threaded rod coupled to said feed means, a traveler nut on said threaded rod coupled to said gear rack, a limit stop adjustably mounted on said boring bar along the path of said traveler nut for limiting movement of said traveler nut and said gear rack.

11. A boring bar assembly for the reception of one or more threaded tool holders, said assembly comprising,
a bar having cross-bores spaced therealong, said bar defining a channel in communication with said cross-bores, said bar also defining a bore in communication with said channel, an end cap on said bar, thrust bearings carried by said end cap,
tool holder receiving means at each of said cross-bores for receiving a threaded tool holder and including gear means for threaded engagement with a tool holder in one of said cross-bores, closure means at each of said cross-bores,
a control adjacent one end of said bar,
a threaded rod in the bar defined bore and having a traveler nut, said rod supported against axial loads by said thrust bearings, and
a gear rack in said channel and attached to said traveler nut and in engagement with said gear means for imparting rotation thereto to position the tool holder relative the bar.

12. The boring bar assembly claimed in claim 11 wherein said tool holder receiving means includes a bushing having planer internal walls.

13. The boring bar assembly claimed in claim 12 wherein said gear means is a pinion gear journalled on said bushing.

14. The boring bar assembly claimed in claim 11 wherein said control is a handwheel.

15. The boring bar assembly claimed in claim 14 additionally including limit stop means positionable along said bar in the path of said traveler nut to limit nut and gear rack travel.

16. The boring bar assembly claimed in claim 11 wherein said bar has a cylindrical exterior, said closure is a plate having an outer surface contiguous with the exterior of the bar.

* * * * *